United States Patent
Jansch

(10) Patent No.: US 6,443,458 B1
(45) Date of Patent: Sep. 3, 2002

(54) PACKER

(75) Inventor: Manfred Jansch, Garbsen (DE)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/462,385

(22) PCT Filed: Jul. 22, 1998

(86) PCT No.: PCT/EP98/04923
§ 371 (c)(1),
(2), (4) Date: Apr. 11, 2000

(87) PCT Pub. No.: WO99/05495
PCT Pub. Date: Feb. 4, 1999

(30) Foreign Application Priority Data

Jul. 23, 1997 (EP) .............................. 97112612

(51) Int. Cl.⁷ .............................. E21B 33/10
(52) U.S. Cl. ................... 277/336; 277/335; 277/337; 277/338; 277/341
(58) Field of Search ................. 277/323, 336, 277/337, 338, 339, 341, 335; 166/187, 203

(56) References Cited

U.S. PATENT DOCUMENTS

| | | | | |
|---|---|---|---|---|
| 2,305,282 A | * | 12/1942 | Taylor | 277/355 |
| 2,836,252 A | * | 5/1958 | Lane | |
| 2,885,009 A | * | 5/1959 | Baker | |
| 3,417,673 A | * | 12/1968 | Bowerman | 277/335 |
| 3,822,067 A | * | 7/1974 | Berry et al. | |
| 4,265,459 A | * | 5/1981 | Greenlee et al. | |
| 5,904,354 A | * | 5/1999 | Collins | |

* cited by examiner

Primary Examiner—Lynne H. Browne
Assistant Examiner—Enoch Peavey
(74) Attorney, Agent, or Firm—Moser, Patterson & Sheridan, L.L.P.

(57) ABSTRACT

A packer comprises an elastomeric member (2) which, in use, will deform radially when subjected to axial pressure. A plurality of steel fingers (3, 4) are vulcanized onto the elastomeric member (2). One end of each steel finger (3, 4) is accomodated in a recess in a bearing ring (5). The cross section of the fingers (3, 4) is generally wedge-shaped so that, when axial pressure is applied to the elastomeric member (2), the fingers (3, 4) pivot outwardly yet completely circumscribe the sealing member (2). The packer is particularly useful for applications where the packer must pass through a relatively narrow opening yet seal a relatively wide tubular.

20 Claims, 1 Drawing Sheet

PACKER

During the construction, maintenance and repair of oil and gas wells it is often desirable to be able to isolate one part of a wellbore from another. This is typically achieved by using a device known as a packer.

Typically, packers are manoeuvred into place at the position where it is desired to create a seal and then inflated.

One of the limitations of existing packers is that they must have an uninflated diameter which is close to the inflated diameter. If this is not the case then the seals may fail particularly if the packers are being used to isolate a section of tubing for pressure testing.

In practice it is often desirable to be able to introduce a packer through a tubular of relatively narrow diameter yet use the packer to seal a tubular of somewhat wider diameter.

At the present time there are no satisfactory solutions to this problem.

The present invention addresses some of the problems involved.

According to one aspect of the present invention there is provided a packer which comprises an elastomeric member which, in use, will deform radially when subject to axial pressure, characterised by a plurality of fingers which are secured to said elastomeric member.

By securing the fingers to the elastomeric material the fingers will contract after radial pressure ceases to be applied to said elastomeric member, and said elastomeric member resumes its original shape. This helps ensure that the packer can be withdrawn through the tubular after use.

Preferably, the fingers will be made of metal, for example, steel. Aluminium and softer metals could conceivably also be used according to the intended duty of the packer.

Advantageously, the elastomeric material is rubber and said fingers are vulcanised to said elastomeric material.

According to another aspect of the invention there is provided a packer comprising an elastomeric material which, in use, will deform radially when subject to axial pressure, characterised by a plurality of fingers which are supported by said elastomeric material and one end of which is retained by a retainer so that when axial pressure is applied to said elastomeric material said fingers pivot outwardly about said one end.

Preferably, said retainer comprises a ring having a recess shaped to receive said one end of said fingers.

Advantageously, said one end of said fingers is rounded.

According to a third aspect of the present invention there is provided a packer comprising an elastomeric material which, in use, will deform radially when subject to axial pressure, characterised by a plurality of fingers which extend circumjacent said elastomeric material and which have cross-sections which co-operate with one another to completely circumscribe said elastomeric material as said elastomeric material is deformed radially when being subjected to axial pressure.

Preferably, alternate ones of said fingers are of wedge shape cross-section facing radially inwardly interdigitated by fingers of wedge shape cross-section facing radially outwardly.

Advantageously, when said elastomeric material is not subject to axial pressure, said fingers project radially outwardly by differing distances. In such embodiments it is intended that when the packer is inflated the radially outer and radially inner extremities of the fingers will lie on substantially concentric circles.

When combined together the above features provide a very desirable packer.

Preferably, the fingers are tapered.

Advantageously, the fingers only extend along part (preferably about one half) of the axial length of the elastomeric member in its non-compressed state.

Preferably, the free extremity of each of the fingers is rounded. This helps to ensure that the fingers do not damage the elastomeric material or the wall of the casing.

Packers in accordance with the present invention may be actuated hydraulically, pneumatically, mechanically or electrically as desired.

For a better understanding of the present invention, reference will now be made, by way of example, to the accompanying drawings, in which.

Figure 1:
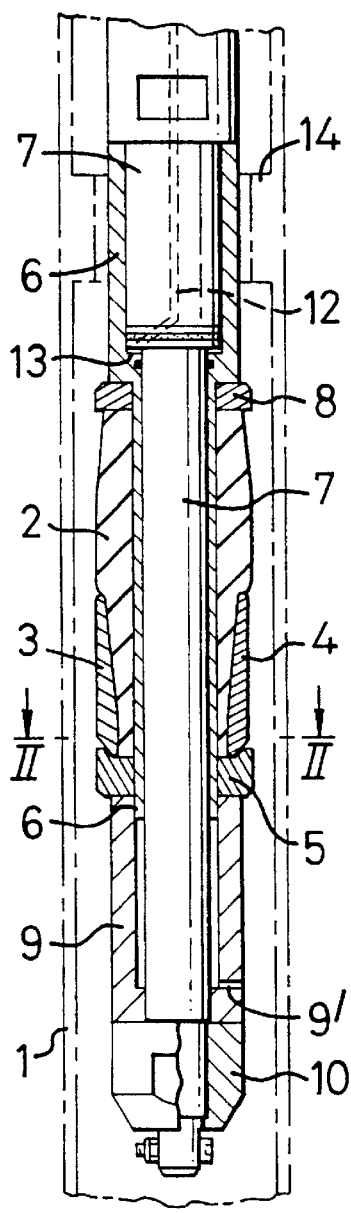
FIG. 1 is a longitudinal section through a packer in accordance with the present invention, shown in its rest position.
Figure 2:
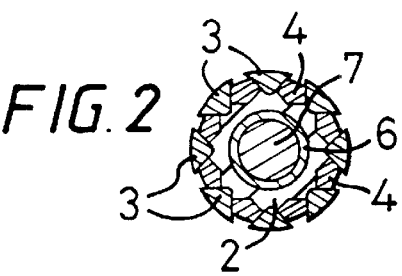
FIG. 2 is a cross-section taken on line II—II of FIG. 1.
Figure 4:
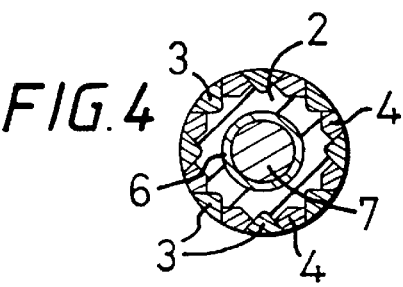
FIG. 4 is a cross-section taken on line IV—IV of FIG. 3.

Referring to FIGS. 1 and 2 of the drawings, there is shown an annular sealing member 2 disposed inside a pipe 1. The annular sealing member 2 is made from an elastomer material and is provided at its lower end with fingers 3 and 4, one end of which extends into a recess in a bearing ring 5.

The sealing member 2 sits on a thrust sleeve 6, the upper end of which is of a larger diameter. The thrust sleeve 6 is slidably seated on a bearing shaft 7. The upper end thereof is also provided with a piston which fits snugly in the internal diameter of the thrust sleeve 6. Disposed between the outer shoulder of the thrust sleeve 6 and the rear end of the sealing member 2 is a thrust collar 8 which transmits thrust forces to the elastomeric material of the sealing member 2.

The bearing ring 5 lies with one face against a hollow cylinder 9 which bears against a threaded nut 10 on a threaded section of the bearing shaft 7. The hollow cylinder 9 is provided with a vent 9' to enable the bearing shaft 7 to move freely relative thereto. A pressurised hydraulic or pneumatic fluid can be delivered via a bore 12 in the bearing shaft 7 into the annular chamber 13 between the bearing shaft 7 and the thrust sleeve 6.

In the rest position (FIGS. 1 and 2), the sealing member 2 can be passed through a narrow pipe section 14 to reach a pipe section with a larger diameter.

Figure 3:
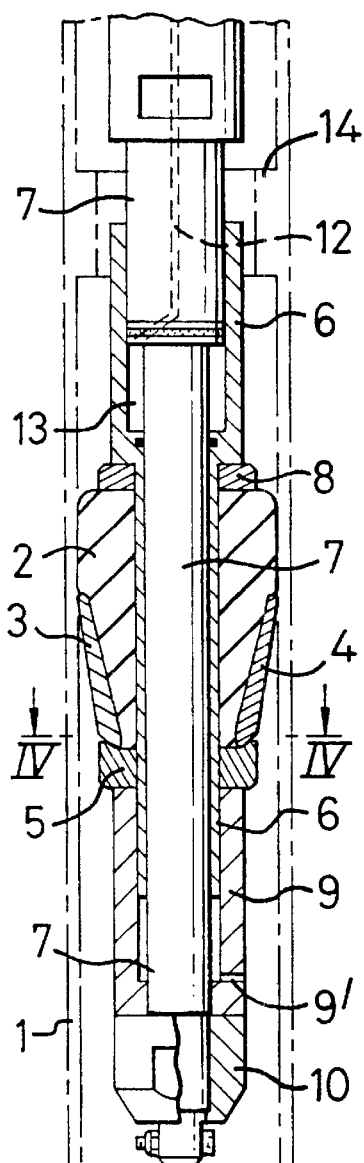
FIG. 3 is a view similar to FIG. 1 but showing the packer in the sealing position.
Figure 5:
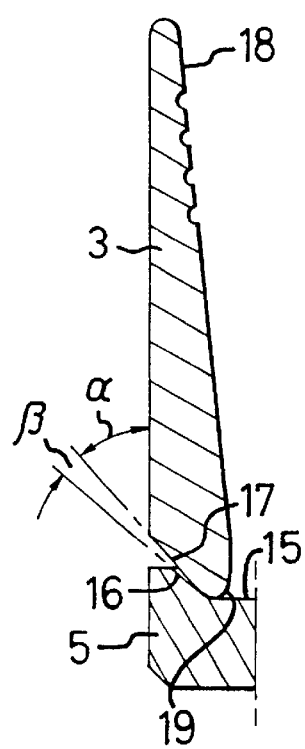
FIG. 5 shows, to an enlarged scale, a section of a finger and part of a bearing ring.

In order to seal the pipe, pressurised hydraulic or pneumatic fluid is fed through the bore 12 into the annular chamber 13, which is extended due to the pressure of the working fluid delivered by means of the sliding of the thrust sleeve 6 in translation. The pressure imparts a thrust force to the thrust sleeve 6, which is transferred via the thrust collar 8 onto the elastomeric material of the sealing member 2. The elastomeric material expands radially until it comes to rest against the inner surface of the pipe since the conically tapering rear ends of the fingers 3 and 4 open out under the axial thrust force and are pressed firmly against the inner surface of the pipe 1. The front ends are rounded as a means of assisting and facilitating this opening movement, as can be seen particularly clearly from FIG. 5. In particular, one end of each of the fingers 3, 4 lies in an annular recess 15 in the bearing ring 5. The outer edge 16 of the recess 15 is conical in shape and acts as a stop for the front edge 17 of the fingers. This edge is inclined at an angle α against the upper edge which is axially oriented in the rest position. The angle β defines the free space between the front edge 17 and the stop face 16 of the bearing ring 5 when the sealing member 2 is in the rest position. The edge 18 of the fingers pointing radially inwards has an incline which is directed radially outwards, which facilitates the procedure by which the elements open outwards, as can be seen particularly clearly from FIG. 3.

In the rest position, the fingers 3 and 4 are located on different radii as shown in FIG. 2. In the sealing state, both the outer 3 and the inner fingers 4 are not only opened out but at the same time pushed radially outwards. Consequently, due to their conical cross-sections, they remain in constant contact as they slide radially outwards so that no elastomeric material can come between the sliding surfaces.

With a sealing member constructed as described relatively large differences in diameter can be bridged, making it possible to pass through narrow sections within a pipe or very narrow lengths of pipe. This ability is of particular importance when attempting to create a seal between a pipe string and the surrounding formation, specifically because it is very often necessary to pass the packer through narrow tubulars. The sealing pressures which can be applied with one packer according to the invention can be as much as 100 bar and more. The use of the subject-matter of the invention is not restricted to testing pipe joints. The subject-matter of the invention can be used as a means of breaking down any hollow volume into sections of varying pressure.

What is claimed is:

1. A packer, comprising:
   an elastomeric material deformable radially when subject to axial pressure; and
   a plurality of fingers, having a free end and a retained end, which extend circumjacent said elastomeric material and which have cross-sections which cooperate with one another to completely circumscribe said elastomeric material as said elastomeric material is deformed radially when being subjected to axial pressure and contractible upon release of axial pressure.

2. The packer of claim 1, wherein the fingers are made of metal.

3. The packer of claim 1, wherein said elastomeric material is rubber and said fingers are bonded to said elastomeric material.

4. The packer of claim 3, wherein the elastomeric material is vulcanised.

5. The packer of claim 4, wherein alternate ones of said fingers are of wedge shape cross-section facing radially inwardly interdigitated by fingers of wedge shape cross-section facing radially outwardly.

6. The packer of claim 5, when said elastomeric material is not subject to axial pressure, said fingers project radially outwardly by differing distances.

7. The packer of claim 1, wherein the fingers are tapered.

8. The packer of claim 1, wherein the fingers extend partially along an axial length of the elastomeric member in its non-compressed state.

9. The packer of claim 8, wherein the fingers extend along one half of the axial length of the elastomeric material in its non-compressed state.

10. The packer of claim 1, wherein the free end of each of the fingers is rounded.

11. The packer of claim 1, wherein both the fingers and the elastomeric material contract together upon release of axial pressure allowing the packer to be withdrawn through a surrounding tubular.

12. A packer, comprising:
    an elastomeric material deformable radially when subject to axial pressure; and
    a plurality of fingers which extend circumjacent said elastomeric material and which have cross-sections which cooperate with one another to completely circumscribe said elastomeric material as said elastomeric material is deformed radially when being subjected to axial pressure, wherein alternate ones of said fingers are of wedge shape cross-section facing radially inwardly interdigitated by fingers of wedge shape cross-section facing radially outwardly.

13. The packer of claim 12, when said elastomeric material is not subject to axial pressure, said fingers project radially outwardly by differing distances.

14. The packer of claim 12, wherein both the fingers and the elastomeric material contract together upon release of axial pressure allowing the packer to be withdrawn through a surrounding tubular.

15. A packer, comprising:
    an elastomeric material radially deformable when subjected to axial pressure;
    a plurality of fingers having a free end and a rounded retained end, wherein the fingers are secured to an outer diameter of the elastomeric material; and
    an annular ring having a recessed surface to receive the rounded retained ends of the fingers which allows each finger to pivot about its retained end.

16. The packer of claim 15, wherein both the fingers and the elastomeric material contract together upon release of axial pressure allowing the packer to be withdrawn through a surrounding tubular.

17. The packer of claim 15, wherein each finger pivots radially outward when acted upon by the axial pressure.

18. The packer of claim 15, wherein each finger pivots radially inward upon release of the axial pressure.

19. The packer of claim 15, wherein the fingers extend partially along an axial length of the elastomeric member in is non-compressed state.

20. The packer of claim 19, wherein the fingers extend at least one half of the axial length of the elastomeric material in its non-compressed state.

\* \* \* \* \*